United States Patent [19]
Carlson et al.

[11] Patent Number: 5,748,883
[45] Date of Patent: *May 5, 1998

[54] DISTRIBUTED DEVICE STATUS IN A CLUSTERED SYSTEM ENVIRONMENT

[75] Inventors: Brent Allen Carlson; Frederic Lawrence Huss; Nancy Marie Schmucki; Richard Elmer Zelenski, all of Rochester, Minn.

[73] Assignee: International Business Machines Corporation, Armonk, N.Y.

[*] Notice: The term of this patent shall not extend beyond the expiration date of Pat. No. 5,600,791.

[21] Appl. No.: 691,054

[22] Filed: Aug. 1, 1996

Related U.S. Application Data

[62] Division of Ser. No. 492,676, Jun. 20, 1995, Pat. No. 5,600,791, which is a continuation of Ser. No. 954,203, Sep. 30, 1992, abandoned.

[51] Int. Cl.⁶ .................................................. G06F 13/00
[52] U.S. Cl. ........................... 395/184.01; 395/185.01
[58] Field of Search ...................... 395/184.01, 325, 395/600, 48, 185.01, 185.1, 200.03, 200.11, 835, 836, 837, 838, 839

[56] References Cited

U.S. PATENT DOCUMENTS

| | | | |
|---|---|---|---|
| 4,266,271 | 5/1981 | Chamoff et al. | 364/200 |
| 4,400,773 | 8/1983 | Brown et al. | 364/200 |
| 4,412,281 | 10/1983 | Works | 364/200 |
| 4,633,245 | 12/1986 | Blount et al. | 304/825.03 |
| 4,654,820 | 3/1987 | Brahm et al. | 364/900 |
| 4,654,857 | 3/1987 | Samson et al. | 371/68 |
| 4,807,228 | 2/1989 | Dahbura et al. | 371/9 |
| 4,847,837 | 7/1989 | Morales et al. | 371/8 |
| 5,136,498 | 8/1992 | McLaughlin et al. | 364/184 |
| 5,161,156 | 11/1992 | Baum et al. | 371/7 |
| 5,166,674 | 11/1992 | Baum et al. | 340/825.07 |
| 5,202,822 | 4/1993 | McLaughlin et al. | 364/187 |
| 5,239,629 | 8/1993 | Miller et al. | 395/325 |
| 5,255,388 | 10/1993 | McLaughlin et al. | 395/600 |
| 5,261,092 | 11/1993 | McLaughlin et al. | 395/600 |
| 5,276,823 | 1/1994 | Cutts, Jr. et al. | 395/575 |
| 5,287,453 | 2/1994 | Roberts | 395/200 |
| 5,299,207 | 3/1994 | Fujii | 371/29.1 |
| 5,371,852 | 12/1994 | Attanasio et al. | 395/200 |

*Primary Examiner*—Robert W. Beausoliel, Jr.
*Assistant Examiner*—Norman M. Wright
*Attorney, Agent, or Firm*—Steven W. Roth

[57] ABSTRACT

Problem ownership and status propagation in a clustered system environment must be coordinated in a way that avoids redundant and/or conflicting recovery efforts. IOP managers which overcome these problems are disclosed. A primary IOP manager is one which has problem ownership for a particular IOP. There is only one primary IOP manager for each IOP. A secondary IOP manager is one which resides upon a computer system that shares the resources of a particular IOP or IOPs, but nevertheless does not have problem ownership for that particular IOP(s). There are one or more secondary IOP managers for a given IOP. When a primary IOP manager is informed of a problem in a device attached to a shared IOP, it updates resident system management information to indicate the new status of the subject device, informs its local system management of the problem so that corrective actions may be taken, and sends the status information to the secondary IOP managers via the IOP itself. When a secondary IOP manager is informed of a problem with a device attached to a shared IOP, it updates system management information to indicate the new status of the subject device and sends the status information to the primary IOP manager and other secondary IOP managers via the IOP itself. The secondary IOP manager does not, however, inform its local system management that corrective actions are required.

2 Claims, 8 Drawing Sheets

Input/Output Processor

Remote Failure Notification Acknowledgement Message Format

DISTRIBUTED DEVICE STATUS IN A CLUSTERED SYSTEM ENVIRONMENT

This is a division of U.S. application Ser. No. 08/492,676 filed Jun. 20, 1995 now U.S. Pat. No. 5,600,791, which is a continuation of U.S. application Ser. No. 07/954,203, filed on Sep. 30, 1992, which is now abandoned.

FIELD OF THE INVENTION

This invention relates to the data processing field. More specifically, this invention relates to the communication of status information to processors which share resources.

BACKGROUND OF THE INVENTION

Since early computer systems performed only simple tasks, it was unnecessary for them to include more than one input/output unit (I/O unit). For this reason, computer systems such as the EDVAC device of 1948 contained only a single I/O unit. The I/O unit was merely the mechanism used by the computer system to communicate with the outside world. Since these early computer systems required a relatively small amount of information, the I/O unit could be controlled by the central processing unit (CPU) itself. As time passed, the complex tasks performed by computer systems required access to more and more information. Direct control of the I/O unit by the CPU was no longer practical.

In 1959, Univac corporation introduced its LARC computer system. The LARC computer system included an input/output controller (IOC) which was itself a genuine computer. The IOC was used to handle the flow of information to and from the outside world, thereby reducing the work required of the main CPU. Because of the need to handle huge amounts of data in the "information age," modern day computer systems usually include several I/O controllers. These I/O controllers are called input/output processors (IOPs). Similar to the IOC of the LARC computer system, IOPs are computer systems unto themselves. Each IOP is responsible for handling the information flow between one or more external devices (i.e., "the outside world") and the computer system.

The wide use of IOPs has greatly improved the overall performance of today's computer systems. Computer systems now communicate with a variety of external devices without overly burdening the main CPU. Examples of devices which are connected via IOPs include: terminals, magnetic storage units, optical storage devices, programmable workstations, and other computer systems. To the computer system, each of these external devices represents a resource that can be used to perform a specified task. In many cases, the task to be performed is accomplished by the external devices without extensive intervention on the part of the CPU. This, of course, greatly reduces the work required of the CPU.

To further leverage the power of IOPs, individual computer systems share IOPs and the associated external devices. When these independent computer systems are brought together, they form what is called a clustered computer system. A clustered computer system is to be distinguished from the parallel processor computer systems of today. While today's parallel computing systems often contain several CPUs which run a single operating system, the clustered computer systems of the future are each self contained computer systems which run individual, possibly different, operating systems.

However, there are two significant impediments to implementing this clustered approach. The first is the difficulty of coordinating problem ownership (i.e., service and maintenance action) between the sharing computer systems. The second impediment involves propagating the current status of the various devices amongst the sharing computer systems. To simply allow any computer system to handle problem ownership would, at a minimum, lead to confusion; but most likely, it would result in redundant and/or conflicting service and maintenance efforts. Of equal importance is the need to communicate status information to each sharing computer system in a way that is fully informative and timely, yet does not provide them with redundant or conflicting information.

Conventional problem ownership and status propagation schemes have not been designed to handle this clustered approach. Therefore, their application to this configuration has several shortcomings. For example, in the IBM 370 environment, each device is responsible for its own problem ownership and status propagation. Of course, there is no difficulty determining problem ownership since each device is responsible for its own problems. However, status propagation is left to human intervention (i.e., computer technicians) which is, of course, extremely expensive and time consuming. Further, devices typically have different problem ownership schemes and different ways of communicating status information to the technician. Hence, the technicians must understand a plethora of different recovery schemes and user interfaces. While this may provide job security for computer technicians, it does little to handle the difficulties inherent in the clustered computer systems of the future. Human intervention is not contemplated nor is it preferred. To be successful in the marketplace, the computer systems of today, and the future, must be able to propagate status information in a way that does not rely on expensive human intervention.

Another conventional approach is embodied in the current IBM AS/400 midrange computer. The AS/400 problem ownership and status propagation scheme does provide for status propagation without the expensive human intervention of the 370 environment. Each of the devices attached to the IOPs of the AS/400 computer system reports status information directly to the responsible IOP which in turn reports the status information directly to the main CPU. However, the current AS/400 computer system involves only a single computer, and hence, it lacks the ability to coordinate problem ownership amongst several computer systems. If this scheme were applied to the clustered system environment of the future, redundant and/or conflicting service and maintenance efforts would most certainly result.

SUMMARY OF THE INVENTION

It is a principal object of this invention to provide an enhanced method and apparatus for coordinating problem ownership in a clustered system environment.

It is another object of this invention to provide an enhanced method and apparatus for propagating status information amongst the CPUs of a clustered system environment.

It is still another object of this invention to provide an enhanced method and apparatus for coordinating problem ownership in a network environment.

It is yet another object of this invention to provide an enhanced method and apparatus for propagating status information amongst the nodes of a network.

These and other objects are accomplished by the problem ownership and status propagation mechanism disclosed herein.

Problem ownership and status propagation in a clustered system environment must be coordinated in a way that avoids redundant and/or conflicting recovery efforts. IOP managers which overcome these problems are disclosed. The IOP managers are characterized throughout this specification as being "primary", "secondary," or "local."

A primary IOP manager has problem ownership for a particular IOP. There is only one primary IOP manager for each IOP. A secondary IOP manager resides upon a computer system which shares the resources of a particular IOP or IOPs, but nevertheless does not have problem ownership for that particular IOP(s). There are one or more secondary IOP managers for a given IOP. Primary and secondary IOP managers are further characterized as local IOP managers. A local IOP manager is one which is the first to be informed of a problem with a device that is attached to a shared IOP. A local IOP manager is therefore also a primary or secondary IOP manager.

When a local IOP manager is informed of a problem in a device attached to a shared IOP, it first determines whether or not it is the primary IOP manager associated with that IOP. If the local IOP manager determines that it is the primary IOP manager, it updates resident system management information to indicate the new status of the subject device, informs its local system management of the problem so that corrective actions may be taken, and sends the status information to the secondary IOP managers via the IOP itself. When the secondary IOP managers receive the status information they too update their resident system management information to indicate the new status of the device; however, the secondary IOP managers do not inform their local system management of the need to take corrective action.

If the local IOP manager determines that it is a secondary IOP manager, it updates system management information to indicate the new status of the subject device and sends the status information to the primary IOP manager and other secondary IOP managers via the IOP itself. The local-secondary IOP manager does not, however, inform its local system management that corrective actions are required. When other secondary IOP managers receive the status information they too update their resident system management information to indicate the new status of the device; however, as with the local-secondary IOP managers, the other secondary IOP managers do not inform their local system management of the need to take corrective action. When the primary IOP manager receives the status information, it updates its resident system management information to indicate the new status of the device and informs its local system management of the need to take corrective action.

DESCRIPTION OF THE PREFERRED EMBODIMENT

Figure 1:
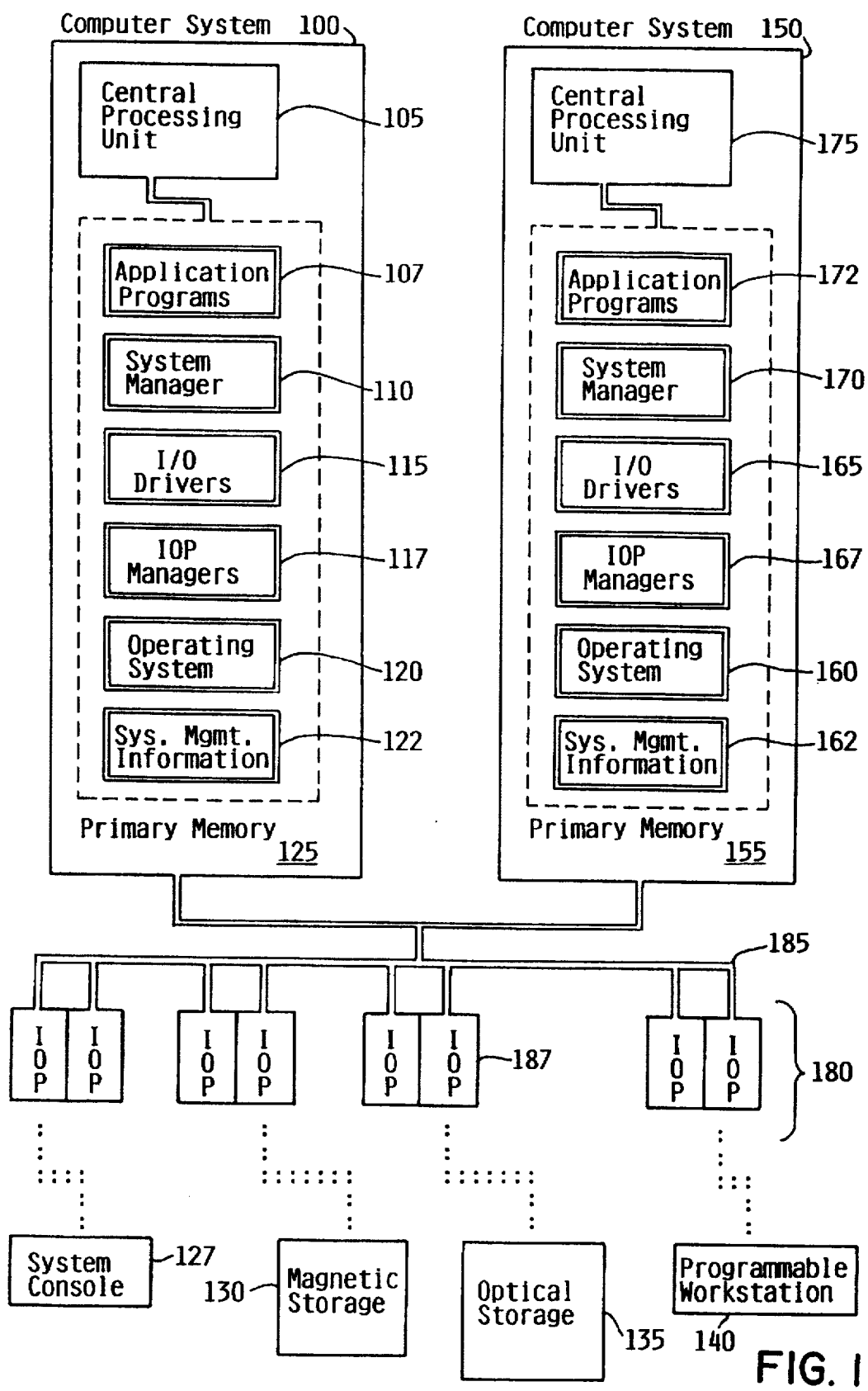
FIG. 1 shows the clustered computer systems of the present invention.

FIG. 1 shows a block diagram of the clustered computer systems of the present invention. The clustered computer systems of the preferred embodiment are enhanced IBM AS/400 mid-range computer systems. However, any computer systems that are capable of operating in a clustered environment could be used. FIG. 1 shows an exploded view of computer systems 100 and 150. It will be understood by those skilled in the art that while FIG. 1 shows two independent computer systems, the present invention applies equally to one or more computer systems. Computer systems 100 and 150 each comprise main or central processing unit (CPU) (105, 175) connected to primary memory (125, 155) and are both coupled to system I/O bus 185. Although the systems depicted in FIG. 1 each contain only a single main CPU and are coupled to a single system I/O bus, it should be understood that the present invention applies equally to computer systems having multiple main CPUs and multiple I/O buses. Similarly, although the I/O bus of the preferred embodiment is a typical hardwired, multidrop bus, any connection means that supports bi-directional communication could be used.

Connected to system I/O bus 185 are IOPs 180. Although FIG. 1 shows eight IOPs and four external devices, the present invention applies equally to any number external devices connected to any number of IOPs. Each of IOPs 180 is designed to communicate via bus 185 to the external device or devices for which it is responsible. Although each IOP is shown to be connected to a single device, the present invention applies equally to multiple devices which are connected to a single IOP. The processors used in the IOPs of the preferred embodiment (IOPs 180) are Motorola 68020 micro computers, but other micro computers, such as the Intel i960, could be used. System console 127 is connected to bus 185 via one of IOPs 180. System console 127 allows system administrators to communicate with computer system 100, normally through a non-programmable workstation. Similarly, magnetic storage 130, optical storage 135, and programmable workstation 140 are each connected to bus 185 via one of IOPs 180. Secondary storage devices 130 and 135 (i.e., magnetic storage 130, and optical storage 135) are used by computer systems 100 and 150 as large storage repositories for data and programs. Programmable workstation 140 allows users and developers to communicate with computer systems 100 and 150.

Primary memory (125, 155) contains application programs (107, 172), system manager (110, 170), I/O drivers (115, 165), IOP managers (117, 167), operating system (120, 160), and system management information (122, 162). Though each of these entities is shown to reside in primary memory (125, 155), it will be understood by those skilled in the art that while these entities will typically reside in primary memory, they may at some point reside in magnetic storage 130 or optical storage 135.

Figure 2:
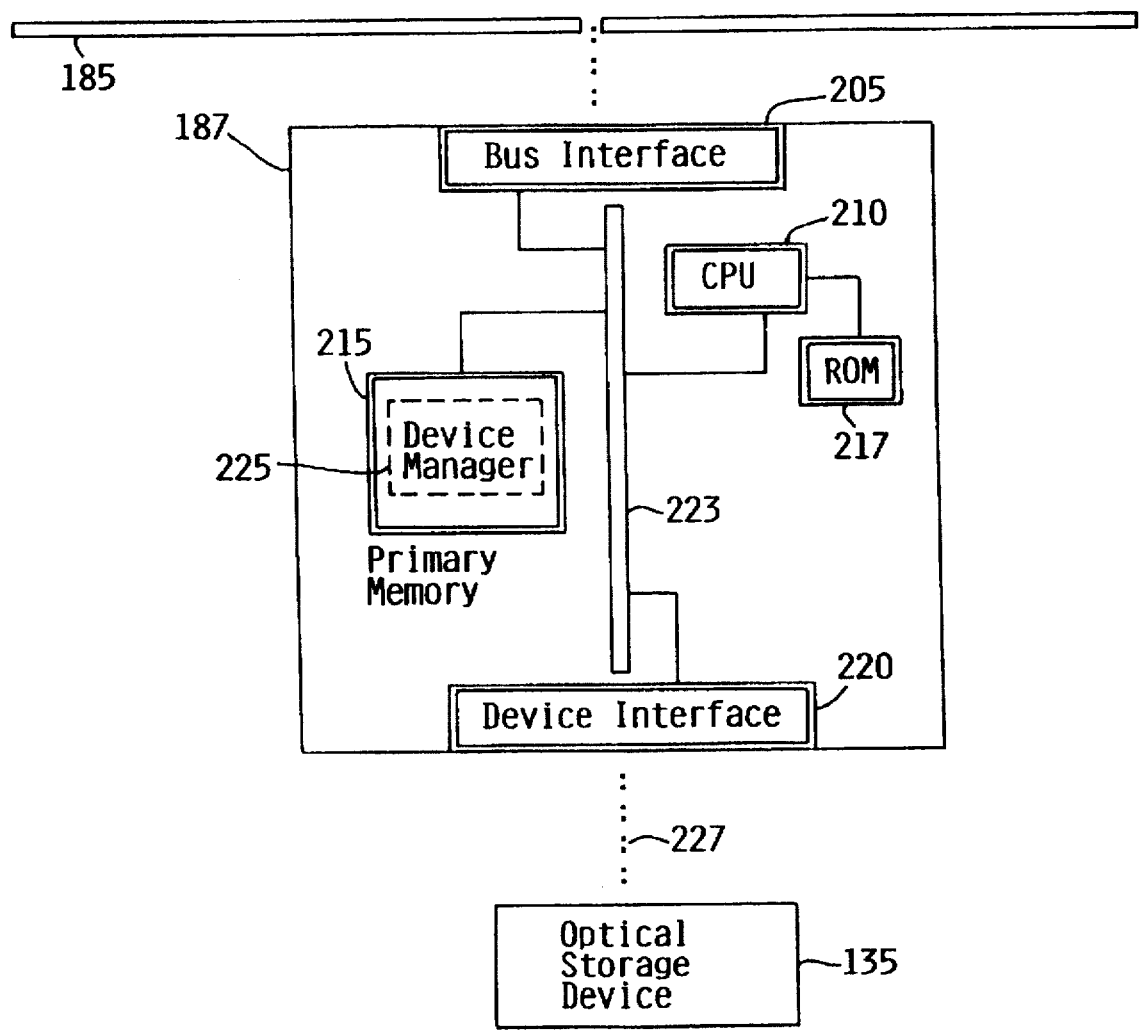
FIG. 2 shows an example IOP and Device Manager.

FIG. 2 shows an exploded view of an exemplary IOP (i.e., IOP 187) that is connected to bus 185. As shown, IOP 187 is used as an interface between I/O bus 185 and optical storage device 135. IOP 187 comprises CPU 210, bus interface 205, primary memory 215, ROM 217 and device interface 220, which are all interconnected via bus 223.

Device interface 220 is interconnected to optical storage device 135 via bus 227. In the preferred embodiment, bus 227 is a SCSI bus, but any industry-standard or proprietary bus could be used. An industry-standard type of bus allows devices from different manufacturers to be attached to IOP 187. Residing in primary memory 215 is device manager 225.

While in many cases bus interface 205, CPU 210, primary memory 215, and bus 223 are the same in each of IOPs 180, device manager 225 and device interface 220 usually depend upon the types of devices that are connected to the subject IOP. Since in this case IOP 187 is connected to optical storage device 135, device manager 225 will be software that is capable of communicating with an optical storage device. Similarly, device interface 220 will comprise input/output hardware commensurate with optical storage device 135.

Figure 3:
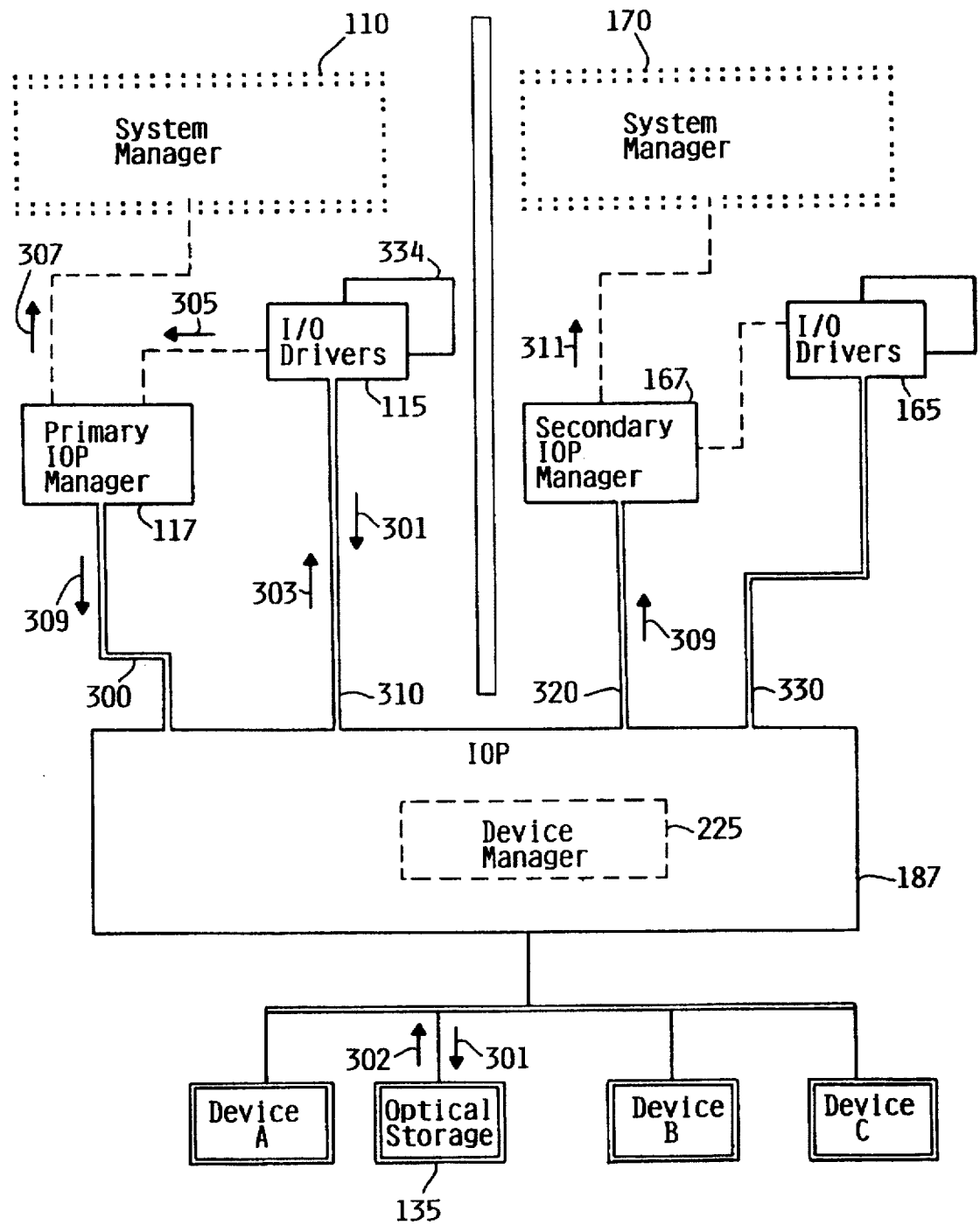
FIG. 3 is a function diagram which shows how the system components of the present invention inter-relate when the computer system on which the primary IOP manager resides is the first to be informed of a device error.
Figure 4:
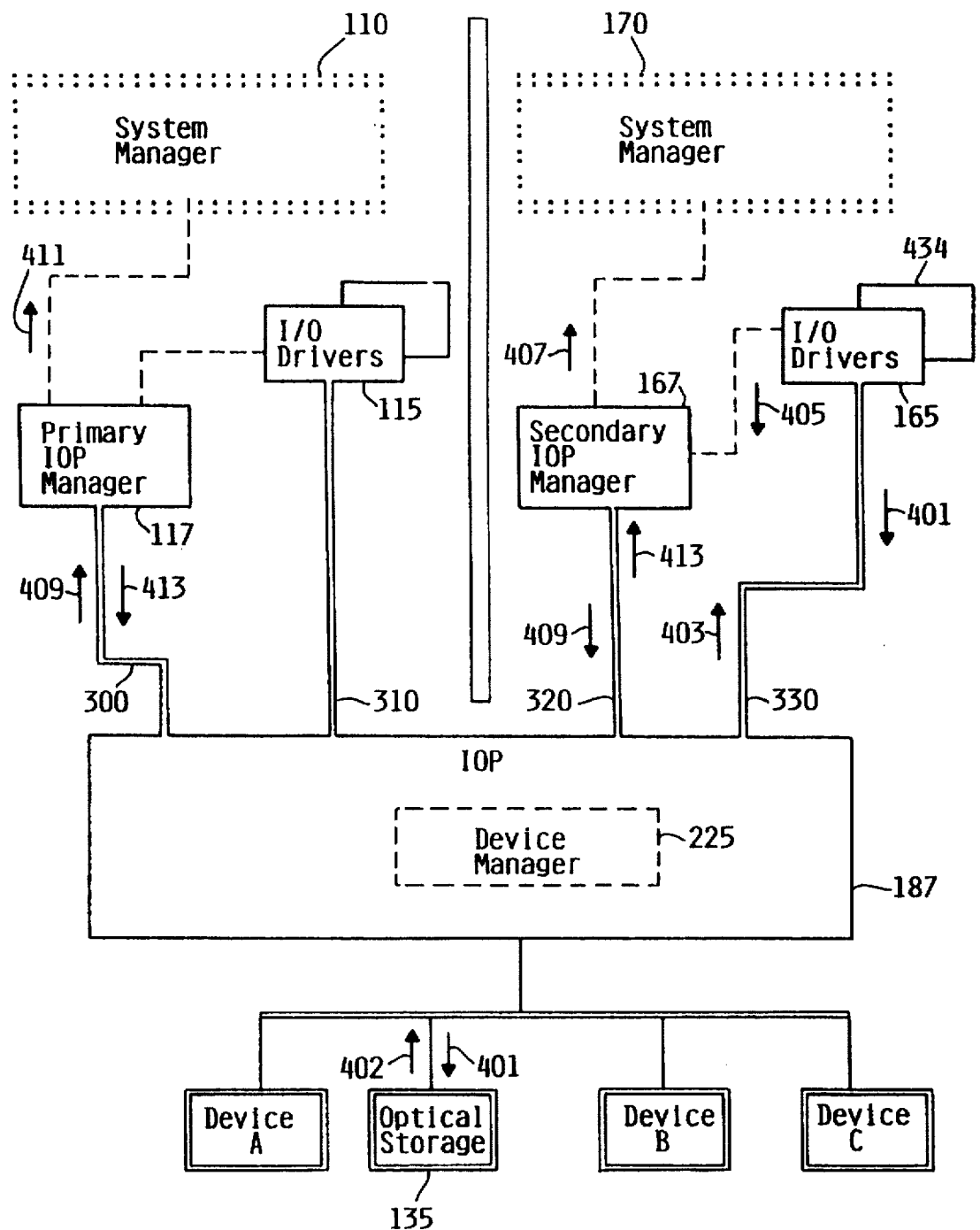
FIG. 4 is a function diagram which shows how the system components of the present invention inter-relate when the computer system on which a secondary IOP manager resides is the first to be informed of a device error.
Figure 5A:
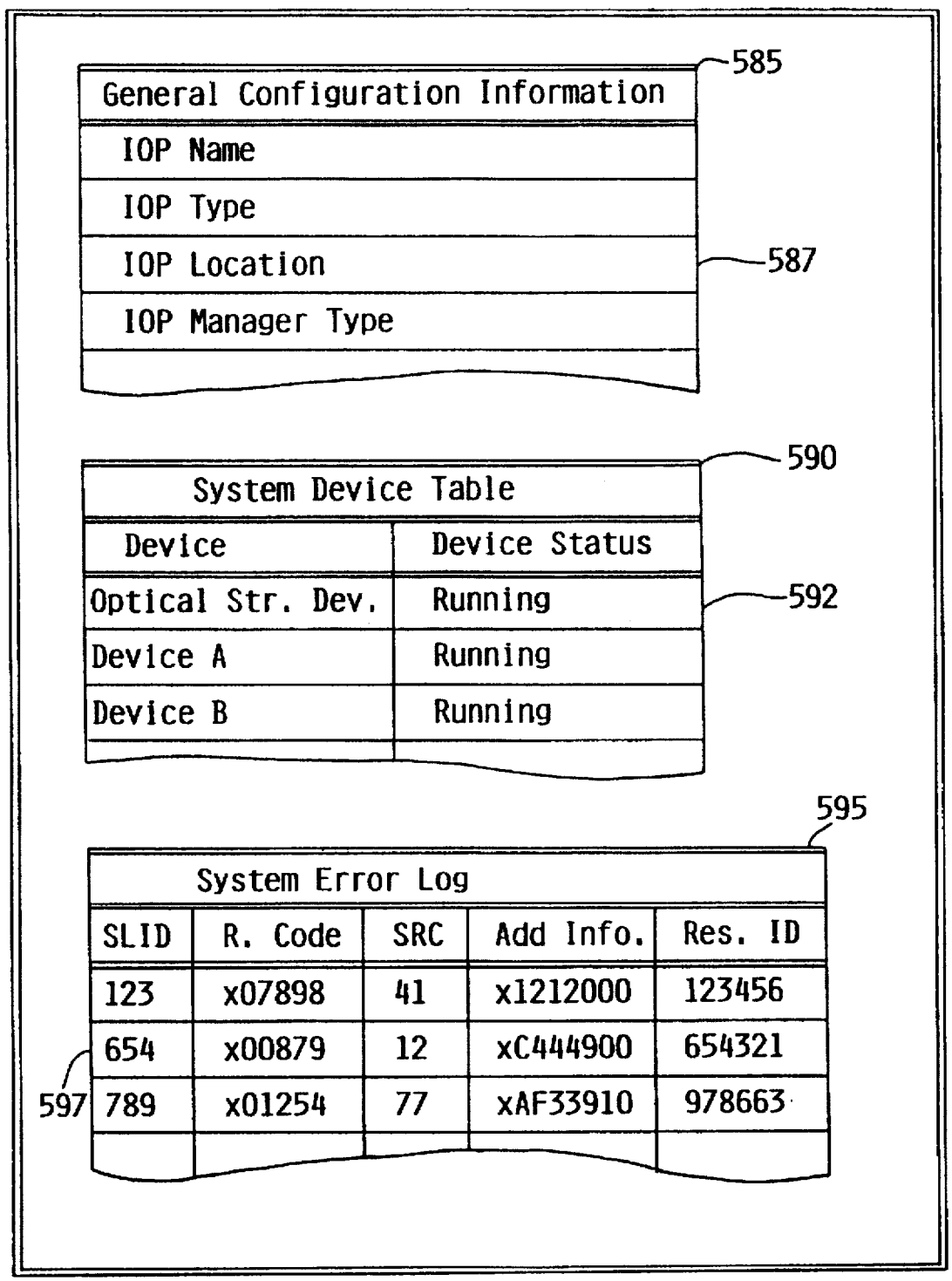
FIG. 5A is a block diagram of the resident system management information of the preferred embodiment.
Figure 5B:
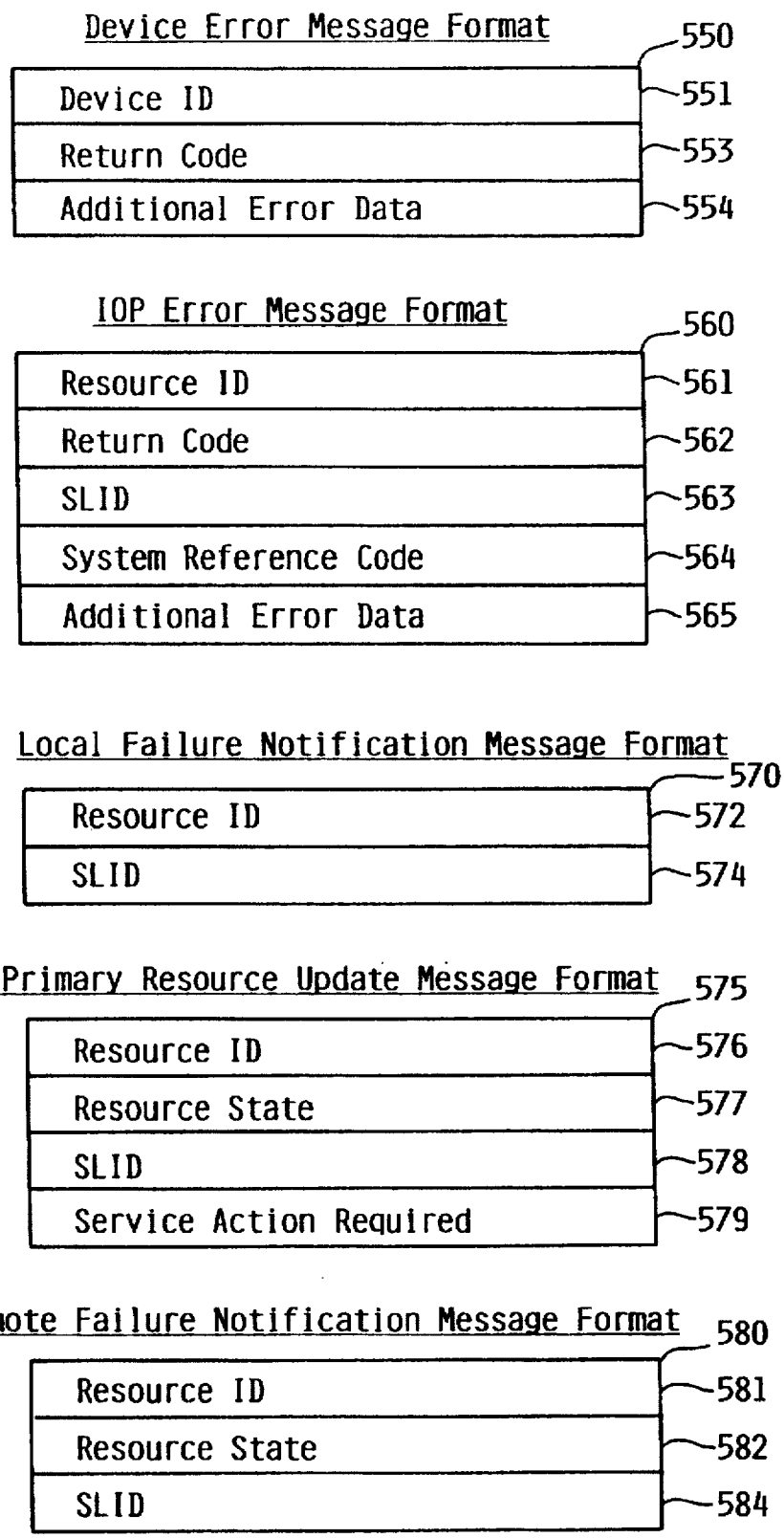
FIGS. 5B and 5C show the message formats for the messages described in FIGS. 3, 4 and 6.
Figure 5C:
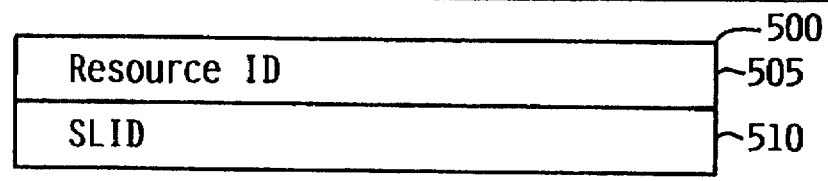

FIGS. 3 and 4 show a function diagram of the components of the present invention. More specifically, these figures show how the components of computer systems 100 and 150 functionally inter-relate with IOP 187 and optical storage device 135. Two examples are set forth below to best explain how the present invention provides a mechanism for handling problem ownership and status propagation in a uniform way. The first example, which revolves around FIG. 3, explains how errors are handled when they are detected by the computer system on which the primary IOP manager resides (i.e., the local IOP manager). The second example, which revolves around FIG. 4, is illustrative of how errors are handled when they are detected by a computer system on which a secondary IOP manager resides (i.e., the local IOP manager). Prior to delving into these examples, however, it is important to have a rudimentary understanding of how the individual computer systems and the IOP come to understand how they relate to one another. FIGS. 5A, 5B and 5C show the message and file formats that are used in the preferred embodiment and for the messages shown and/or described in FIGS. 3, 4 and 6.

INITIALIZATION

When computer systems 100 and 150 and IOP 187 are "powered on," they each commence their own initialization program. The initialization program for the computer systems is initiated by a boot program that runs on service processors (not shown) of computer systems 100 and 150. The initialization program of IOP 187 is located in ROM 217 (i.e., Read-Only-Memory) of IOP 187. Since boot programs, service processors, and ROM are well known in the art, their details will not be described further. As part of the IOP initialization sequence, IOP 187 will first determine which devices are connected to it. IOP 187 will then collect the results of this inquiry into a device configuration record (not shown).

The initialization sequences of computer systems 100 and 150 are also taking place in a parallel fashion. Each of the initialization programs (not shown) on computer systems 100 and 150 "walks" (i.e., investigates) bus 185 to locate and identify the attached IOPs. Both initialization programs then attempt to load device manager 225 on to IOP 187. Since each system will receive power at approximately the same time, both initialization programs will attempt to load device manager 225 in a relatively simultaneous manner. Of course, in the nanosecond realm of computer systems, one initialization program will in fact make the attempt before the other initialization program. The initialization program that is first to make this attempt will be responsible for loading device manager 225 on to IOP 187. Once this is accomplished, the initialization program on each computer system spawns an IOP manager for each IOP connected to bus 185. IOP managers 117 and 167 will then each open logical connections to IOP 187. (Shown as logical connections 300 and 320 respectively.)

After these connections have been set up, IOP managers 117 and 167 first use logical connections 300 and 320 to determine which IOP manager will act as the primary IOP manager for IOP 187. Once again, both IOP managers will attempt to establish primary contact with IOP 187 at approximately the same time. As with the initialization programs, however, one IOP manager will in fact contact IOP 187 before the other IOP manager. The IOP manager that is first to establish contact with IOP 187 will be the primary IOP manager for IOP 187 and the IOP manager that is not the first to establish contact with IOP 187 will be a secondary IOP manager. At this point, it is important to note that there may be more than two IOP managers attempting to establish contact with IOP 187. Hence, while there will be only one primary IOP manager, there could be several secondary IOP managers. The initialization program of IOP 187 will respond (via the appropriate logical connection) to each IOP manager with a message (not shown) that indicates acceptance or rejection of the primary contact attempt. This negotiation, then, creates the relationship between IOP 187 and each of the IOP managers. For the purposes of the forthcoming examples, assume that IOP manager 117 was the first to establish contact with IOP 187 and is, therefore, the primary IOP manager for IOP 187.

When IOP manager 117 receives an acceptance message (not shown) from device manager 225, it will update its general system management information (shown as IOP manager type field 587 on FIG. 5A) to indicate that it is the primary IOP manager for IOP 187. When IOP manager 167 receives a rejection message from device manager 225, it will update its general system management information (shown as IOP manager type field 587 on FIG. 5A) to indicate that it is the secondary IOP manager for IOP 187.

This accomplished, IOP managers 117 and 167 will once again use logical connections 300 and 320 to obtain the device configuration record from IOP 187. From the device configuration record, IOP managers 117 and 167 create system device tables for their system and spawn individual I/O drivers for each device. FIG. 5A shows that system device tables are part of system management information 122 and 162 (as shown on FIG. 1). As an example, I/O driver 334 will be described. I/O driver 334 is one of the plurality of I/O drivers shown on FIGS. 1, 3, and 4 (i.e., I/O drivers 115 and 165). Once spawned, I/O driver 334 will also establish a logical connection with IOP 187 (i.e., logical connection 310). While only logical connection 310 is shown to connect I/O drivers 115 with IOP 187, it should be understood that the connections are set up on an individual I/O driver basis.

All of these logical connections are used to pass commands, error information, and device status information. Although in the figures these connections (i.e., connections 300, 310, 320, and 330) appear as logical connections, it should be understood that the connections actually physically take place on I/O bus 185. In the preferred embodiment, the IBM Inter-process Communication Facility (IPCF) protocol is used to establish these logical connections. However, any protocol capable of creating logical connections could be used. For more information about the IPCF protocol, refer to U.S. Pat. No. 4,649,473 to Hammer et. al which is incorporated herein by reference.

PRIMARY IOP MANAGER MESSAGE FLOW (EXAMPLE 1)

This example shows how error information is handled when the error occurs as a result of an action taken by the computer system on which the primary IOP manager resides. FIG. 3 is the primary diagram used in this example. Assume one of the application programs 107 (shown on FIG. 1, but not shown on FIG. 3) has dispatched message 301 via logical connection 310 for the purpose of accessing data stored on optical storage device 135. When the I/O driver associated with optical storage device 135 (i.e., I/O driver 334) receives message 301, it is responsible for routing the request to IOP 187. Device manager 225 of IOP 187 is in turn responsible for routing the request (message 301) to optical storage device 135. As is known in the art, I/O drivers are used to pass commands and information to attached devices. Message 301 should be taken to be an example command which instructs optical storage device 135 to perform a particular function (here, access and return information). Since, as mentioned, I/O drivers and the associated commands are well known in the art, these drivers and the format of message 301 will not be described further.

Request message 301 is received at IOP 187 by device manager 225. Device manager 225 then relays message 301 to optical storage device 135. Assume that, because of an internal error, optical storage device 135 is unable to process this access request (message 301). Optical storage device 135 may next attempt to resolve the problem via an internal recovery mechanism. While the devices and mechanisms of the preferred embodiment generally contain internal recovery mechanisms, it should be understood that the present invention is not dependent upon such mechanisms nor is operation of the invention precluded by internal recovery mechanisms. At this point, assume that the internal recovery mechanism of optical storage device 135 is unable to correct the problem which is preventing service of the access request message 301. Hence, optical storage device 135 notifies device manager 225 of the problem by sending device error message 302. The format of device error message 302 is shown on FIG. 5B. Device error message format 550 comprises device ID field 551, return code field 553, and additional error data field 554.

Device ID field 551 is used to hold the unique identifier of the failing device. In the case at hand, the unique identifier associated with optical storage device 135 would occupy this field. These unique identifiers are made known to the devices as part of the initialization process of IOP 187 or by some physical means (e.g., switch settings) provided by the device. Return code field 553 will contain a functional problem indicator. A functional problem indicator is a high level representation of the problem. In this case, the functional problem indicator will reveal that there has been a "data access failure." Additional error data field 554 is used for any additional error information that may be available to the optical storage device 135. For example, optical storage device 135 may, as part of its internal recovery process, run self tests to obtain register and/or stack information. If this is the case, optical storage device 135 may elect to include that information in additional error data field 554 of device error message 302.

Device manager 225, being similarly unable to resolve the problem via its internal recovery mechanism, uses logical connection 310 to send IOP error message 303 thereby notifying I/O driver 334 of the problem. The format of the IOP error message of the preferred embodiment is shown on FIG. 5B. IOP error message format 560 comprises resource ID field 561, return code field 562, system log ID (SLID) field 563, system reference code (SRC) field 564, and additional error data field 565.

The contents of resource ID field 561 are derived from device ID field 551 of device error message 302. Device manager 225 of IOP 187 transforms the device ID into a resource ID which is in a form acceptable to higher level components. This transformation is necessary because the architecture of the bus (here, bus 227) connecting the subject IOP and the devices may vary. In this way the particular IOP bus architecture used is hidden from higher level components. Hence, each computer system can communicate with any device by referencing the resource ID, regardless of the IOP bus architecture involved.

Return code field 562 is copied directly from return code field 553 of error message 302. (See the above description for an explanation of these fields.) SLID field 563 is a system wide unique error number that is associated with the particular problem. The SLID field can be used by device manager 225 and IOP manager 117 to correlate multiple IOP error messages. For example, if the device manager 225 later obtains information that pertains to a previous problem, it sends the SLID associated with the previous problem and the new problem information to IOP manager 117. This allows I/O driver 334 to correlate the new problem information with the previous problem information. SRC field 564 is used to hold error information which is more detailed than that contained in return code field 562. For example, if device manager 225 is able to determine that a particular hardware component is responsible for the failure, device manager 225 includes an appropriate indication in SRC field 564 of IOP error message 303. As with the device error message, additional error data field 565 is used for any additional error information that may be available. Device manager 225 copies the contents of the corresponding field in device error message 302 or includes information that it independently obtained as part of its internal error recovery process.

When I/O driver 334 receives IOP error message 303 it too attempts to resolve the problem via an internal recovery mechanism. Being unable to resolve the problem, I/O driver 334 first logs the entire IOP error message into a system error log such that each entry in the error log corresponds to an IOP error message (e.g., entry 597). The system error log can be indexed by either the SLID field or the resource ID field. FIG. 5A shows the system error log of the preferred embodiment.

After the appropriate error information has been logged, I/O driver 334 sends local failure notification message 305 to local IOP manager 117. FIG. 5B shows the format of the local failure notification message of the preferred embodiment. Local failure notification message format 570 comprises resource ID field 572 and SLID field 574. I/O driver 334 copies the contents of these fields directly from IOP error message 303. See the above discussion for an explanation of these fields.

Upon receipt of local failure notification message 305, local IOP manager 117 updates its system device table to indicate that optical storage device 135 is unavailable. FIG. 5A shows the system device table used in the computer systems of the preferred embodiment. In the example, the device status field in entry 592 is updated to indicate that the current status of optical storage device 135 changed from "Running" to "Failed." IOP manager 117 then determines whether it is the primary IOP manager associated with IOP 187. In the preferred embodiment, IOP manager 117 makes this determination by referencing the general system management information which was set up as part of its system's initialization process (shown as IOP manager type field 587 of general system management information 585 on FIG. 5A).

Since in this example local IOP manager 117 is indeed the primary IOP manager associated with IOP 187, IOP manager 117 proceeds to notify its local system manager (i.e., system manager 110) and the secondary IOP managers of the problem. To accomplish the former, primary IOP manager 117 sends resource update message 307 to system manager 110. FIG. 5B shows the format of the resource update message of the preferred embodiment. Resource update message format 575 comprises resource ID field 576, resource state field 577, , SLID field 578, and service action required field 579. As before, resource ID field 576 is copied directly from the previous message. In this case, the contents of resource ID field 576 will be copied from the corresponding field in local failure notification message 305. Resource state field 577 will be filled in by primary IOP manager 117. In the example, an error has occurred so primary IOP manager 117 will appropriately mark this field as "failed." Similarly, since IOP manager 117 is the primary IOP manager for IOP 187, its system manager (i.e., system manager 110) is responsible for resolving the problem. Hence, primary IOP manager 117 will set service action required field 579 to TRUE thereby indicating that corrective action is required of local system manager 110. System manager 110 will use the contents of SLID field 578 to retrieve the associated error log entry from system error log 595. The information contained in this error log entry is then used to determine what corrective actions are required.

The corrective actions required of system manager 110 may be an elaborate set of self test scenarios or as simple as an error notification to a system administrator. It will be understood by those skilled in the art that the present invention applies equally to all types of corrective actions.

In addition to notifying system manager 110, primary IOP manager 117 must also notify the other systems which share the failed resource (i.e., optical storage device 135). To accomplish this, primary IOP manager 117 will use IOP 187 to propagate the status information. To this end, primary IOP manager 117 sends remote failure notification message 309 to device manager 225 via logical connection 300. FIG. 5B shows the format of the remote failure notification message of the preferred embodiment. Failure notification message format 580 comprises resource ID field 581, resource state field 582, and SLID field 584. Since the meaning of these fields is the same as that described above, further elaboration is unnecessary. See FIG. 6 for a more detailed description of the IOP managers of the present invention.

When device manager 225 receives remote failure notification message 309, it routes the message to the secondary IOP managers which reside on systems that share the devices connected to IOP 187. In the example, remote failure notification message 309 will be received by IOP manager 167 via logical connection 320. IOP manager 167 appropriately updates its system device table to indicate that optical storage device 135 is currently unavailable. As described above, the device status field would be updated to indicate that the current status of optical storage device 135 had changed from "Running" to "Failed." In addition, IOP manager 167 uses its internal system management information to determine whether it is the primary IOP manager associated with IOP 187. When IOP manager 167 determines that it is a secondary IOP manager associated with IOP 187, it knows that it need not inform its local system manager that corrective action is required. Accordingly, secondary IOP manager copies the appropriate field values from remote failure notification message 309 and sets service action required field 579 of resource update message 311 to FALSE and sends the message to system manager 170.

SECONDARY IOP MANAGER MESSAGE FLOW (EXAMPLE 2)

This example shows how error information is handled when the error occurs as a result of action taken by the computer system on which a secondary IOP manager resides. FIG. 4 is used as the primary diagram for this example. The messages and message formats used in this example are, for the most part, identical to those described in detail in example 1. Hence, while the figures for the subject message format will be pointed out, redundant explanation of individual message fields will be avoided. Assume one of application programs 172 (shown on FIG. 1, but not shown on FIG. 4) has dispatched message 401 on logical connection 330 for the purpose of accessing data stored on optical storage device 135. When the I/O driver associated with optical storage device 135 (i.e., I/O driver 434) receives message 401, it is responsible for routing the request to IOP 187. Device manager 225 of IOP 187 is in turn responsible for routing data request message 401 to optical storage device 135.

Request message 401 is received at IOP 187 by device manager 225. Device manager 225 then relays message 401 to optical storage device 135. As in the above example, assume that, because of an internal error, optical storage device 135 is unable to process data access request message 401. Further assume that the internal recovery mechanism of optical storage device 135 is unable to correct the problem which is preventing service of the access request message 401. Hence, optical storage device 135 notifies device manager 225 of the problem by sending device error message 402. As in the previous example, the format of the device error message of the preferred embodiment is shown on FIG. 5B.

Device manager 225, being similarly unable to resolve the problem via its internal recovery mechanism, uses logical connection 330 to send IOP error message 403 to I/O driver 434, thereby notifying it of the problem. The format of the IOP error message of the preferred embodiment is shown on FIG. 5B. When I/O driver 434 receives IOP error message 403 it too attempts to resolve the problem via an internal recovery mechanism. Being unable to resolve the problem, I/O driver 434 first logs the error information contained in IOP error message 403 into a system error log. See FIG. 5A and the previous example for a description of the system error log of the preferred embodiment.

After the appropriate error information has been logged, I/O driver 434 next sends local failure notification message 405 to local IOP manager 167. FIG. 5B shows the format of the local failure notification message of the preferred embodiment. Upon receipt of local failure notification message 405, local IOP manager 167 first updates its system device table to indicate that optical storage device 135 is unavailable. FIG. 5A shows the system device table used in the computer systems of the preferred embodiment. See the previous example for an explanation of the fields of this table. IOP manager 167 then determines whether or not it is the primary IOP manager associated with IOP 187. In the preferred embodiment, IOP manager 167 makes this determination by referencing the general system management information which was set up as part of its system's initialization process (shown as IOP manager type field 587 of general system management information 585 on FIG. 5A).

When local IOP manager 167 determines that it is not the primary IOP manager associated with IOP 187, IOP manager 167 proceeds to notify the primary IOP manager, the other secondary IOP managers, and its local system manager (i.e., system manager 170) of the problem. To accomplish its first two objectives, secondary IOP manager 167 will use IOP 187 to propagate the status information. To this end, secondary IOP manager 167 starts an internal timer for this particular error and sends remote failure notification message 409 to device manager 225 via logical connection 320. FIG. 5B shows the format of the remote failure notification message of the preferred embodiment. See FIG. 6 for a more detailed description of the IOP managers of the present invention.

When device manager 225 receives remote failure notification message 409, it routes the message to the primary IOP manager and the other secondary IOP managers. Remote failure notification message 409 will be received by primary IOP manager 117 via logical connection 300. Primary IOP manager 117 appropriately updates its system device table to indicate that optical storage device 135 is currently unavailable. As described above, the device status field would be updated to indicate that the current status of optical storage device 135 had changed from "Running" to "Failed." In addition, IOP manager 117 uses its internal system management information to determine whether it is the primary IOP manager associated with IOP 187. When IOP manager 117 determines that it is the primary IOP manager associated with IOP 187, it knows that its local system manager (i.e., systems manager 110) is responsible for taking corrective action. Accordingly, primary IOP manager 117 sets the service action required field of resource update message 411 to TRUE and sends the message to system manager 110. As in the previous example, the corrective action may take many forms.

After primary IOP manager 117 has informed system manager 110 of the need to take corrective action, primary IOP manager sends remote failure notification acknowledgment message 413 back to secondary IOP manager 167 via logical connection 300 and IOP 187. Device manager 225 is responsible for tracking which remote failure notification message came from which secondary IOP manager so that it is able to properly forward remote failure notification acknowledgment messages back to the appropriate secondary IOP manager. The format of the remote failure notification acknowledgment message of the preferred embodiment is shown on FIG. 5C. Remote failure notification acknowledgment message format 500 comprises resource ID field 505 and SLID field 510. These fields are used by secondary IOP manager 167 to properly correlate remote failure notification acknowledgment message 413 with the original problem and thereby stop the appropriate internal timer.

If remote failure notification acknowledgment message 413 is not received by secondary IOP manager 167 prior to the expiration of the associated timer, secondary IOP manager 167 will send another resource update message (not shown) to system manager 170. This resource update message will have the service action required field set to TRUE. In this way corrective action is eventually taken regardless of whether a given message is lost or corrupted.

In addition to notifying the primary IOP manager for IOP 187 and the other secondary IOP managers for IOP 187, secondary IOP manager 167 must also notify system manager 170. To accomplish this, secondary IOP manager 167 sends resource update message 407 to system manager 170. FIG. 5B shows the format of the resource update message of the preferred embodiment. Since IOP manager 167 is a secondary IOP manager for IOP 187, its system manager (i.e., system manager 170) is not responsible for resolving the problem. Hence, secondary IOP manager 167 will set service action required field 579 to FALSE, thereby indicating that corrective action is NOT required of local system manager 170.

Figure 6:
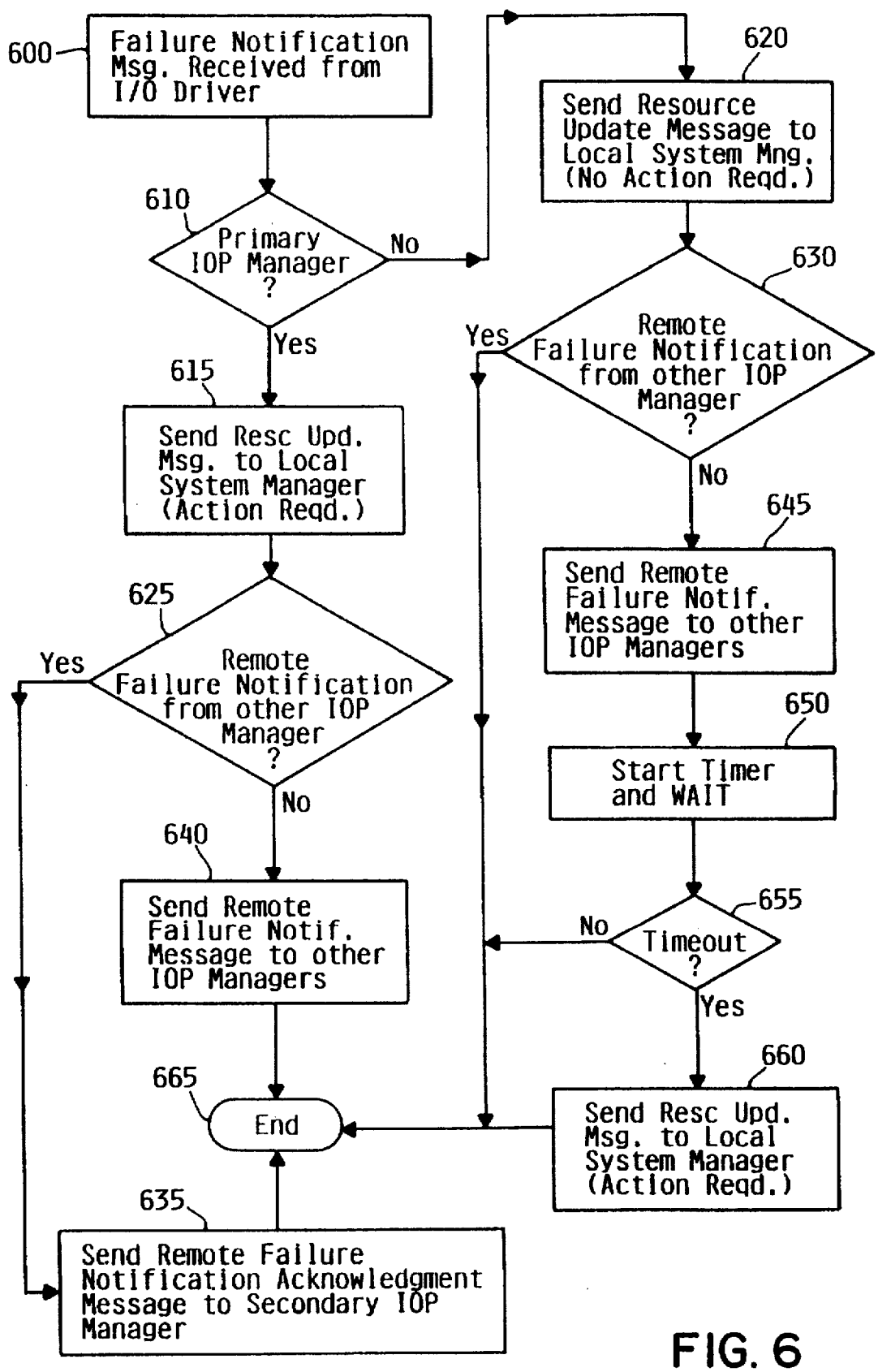
FIG. 6 shows a flow diagram which describes the message processing of an IOP manager.

FIG. 6 shows a flow diagram of the inner workings of the IOP managers of the present invention. As in example 2, the messages described in this portion of the specification were fully described in the first example. Hence, their details will not be reiterated here.

Local failure notification messages are received by the IOP manager in block 600. The IOP manager then determines whether it is the primary IOP manager associated with the subject IOP 610. As mentioned, the IOP manager will make this determination by referencing its general system management information (shown as IOP manager type field 587 on FIG. 5A).

If the IOP manager determines that it is indeed the primary IOP manager associated with this IOP, it sends a resource update message to its local system manager 615. As shown in block 615, this resource update message indicates that corrective action is required of the local system manager. In block 625, the IOP manager asks whether the failure notification message was received from another IOP manager or from a local I/O driver. If the failure notification message was received from another IOP manager, the primary IOP manager must acknowledge receipt of the message by sending a remote failure notification acknowledgment message to the secondary IOP manager that sent the message 635. If the failure notification message was received from a local I/O driver, the primary IOP must inform the secondary IOP managers of the problem. It accomplishes this by sending a remote failure notification message 640. When failure notification message 640 is received by the subject device manager, the device manager ensures that a copy of failure notification message 640 is sent to all of the other IOP managers associated with the particular IOP.

If, in block 610, the IOP manager determines that it is not the primary IOP manager associated with this IOP, it sends a resource update message to its local system manager 620. As shown in block 620, this resource update message indicates that corrective action is not required of the local system manager. In block 630, the IOP manager asks whether the failure notification message was received from another IOP manager or from a local I/O driver. If the failure notification message was received from another IOP manager, the secondary IOP simply terminates execution 665. If, however, the failure notification message was received from a local I/O driver, the secondary IOP manager must inform the primary IOP manager and the other secondary IOP managers of the problem. It does this by sending a single remote failure notification message to the device manager which in turn ensures that the primary IOP manager and each of the other secondary IOP managers receive the message 645. To ensure that the primary IOP manager receives the remote failure notification message, and that corrective action is eventually taken, the secondary IOP manager will start a timer and wait for a remote failure notification acknowledgment message from the primary IOP manager 650. If the timer expires before a remote failure notification acknowledgment message is received 655, the secondary IOP manager sends another resource update message to its local system manager 660. This action is taken to ensure that the problem will eventually be addressed by at least one system manager. If a remote failure notification acknowledgment message is received before the timer expires 655, the secondary IOP manager simply terminates execution 665.

In an alternate embodiment, the present invention is applied to a network of computers. In this embodiment, computer systems 100 and 150 and IOPs 180 are replaced by one or more nodes of a network and primary IOP manager 117 and secondary IOP manager 167 are replaced with primary and secondary communication managers respectively. Device manager 225 is found to reside on an individual device and bus 185 is replaced by one or more networking interfaces. Examples of such networking interfaces include: IEEE 802.5 (Token Ring), IEEE 802.4 (Token Bus), IEEE 802.3 (Ethernet), FDDI, X.25, and ISDN. The methods and apparatus described above apply equally to this embodiment.

Although a specific embodiment along with an alternate embodiment have been disclosed, it will be understood by those skilled in the art that additional variations in form and detail may be made within the scope of the following claims.

What is claimed is:

1. A apparatus, said apparatus comprising:

A clustered computer system, said clustered computer system comprising,
an input/output processor (IOP), said IOP being bus connected to a first computer system and to a second computer system such that said IOP is shared by said first computer system and said second computer system;
a first system manager that executes on said first computer system;
a secondary IOP manager that executes on said second computer system; and
a primary IOP manager that executes on said first computer, said primary IOP manager being responsible for forwarding error information received from said IOP to said first system manager for handling by said first system manager, said primary IOP manager also being responsible for forwarding status information received from said IOP to said secondary IOP manager, said status information not including said error information.

2. An apparatus, said apparatus comprising:

A clustered computer system, said clustered computer system comprising,
an input/output processor (IOP), said IOP being bus connected to a first computer system and to a second computer system such that said IOP is shared by said first computer system and said second computer system;
a first system manager that executes on said first computer system; and
a secondary IOP manager that executes on said second computer system, said secondary IOP manager being responsible for forwarding error information received from said IOP to a primary IOP manager, said primary IOP manager executing on said first computer system, said primary IOP manager being responsible for forwarding said error information to said first system manager for handling by said first system manager.

* * * * *